United States Patent
Muthuswamy et al.

(10) Patent No.: US 11,682,020 B2
(45) Date of Patent: *Jun. 20, 2023

(54) SYSTEM AND METHOD TO REPLAY SUSPICIOUS ACTIVITY DETECTION PIPELINE IN RISK NETWORKS

(71) Applicant: International Business Machines Corporation, Armonk, NY (US)

(72) Inventors: Srinivasan S. Muthuswamy, Bangalore (IN); Subhendu Das, Chapel Hill, NC (US); Mukesh Kumar, Bangalore (IN); Willie Robert Patten, Jr., Hurdle Mills, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,485

(22) Filed: Jul. 13, 2021

(65) Prior Publication Data

US 2023/0019453 A1    Jan. 19, 2023

(51) Int. Cl.
*G06Q 20/40* (2012.01)
*G06F 11/30* (2006.01)
*G06F 11/32* (2006.01)

(52) U.S. Cl.
CPC ..... *G06Q 20/4016* (2013.01); *G06F 11/3072* (2013.01); *G06F 11/327* (2013.01)

(58) Field of Classification Search
None
See application file for complete search history.

(56) References Cited

U.S. PATENT DOCUMENTS

| 7,984,021 | B2 * | 7/2011 | Bhide | G06F 16/2358 |
| | | | | 707/662 |
| 9,031,877 | B1 * | 5/2015 | Santhana | G06Q 20/401 |
| | | | | 705/50 |
| 10,394,793 | B1 | 8/2019 | Todd et al. | |

(Continued)

OTHER PUBLICATIONS

Tatiana A., et al., "Fraud prevention by government auditors", 2017 12th Iberian Conference on Information Systems and Technologies (CISTI). IEEE, 2017, 6 pages.

(Continued)

*Primary Examiner* — Bruce I Ebersman
*Assistant Examiner* — Matthew Cobb
(74) *Attorney, Agent, or Firm* — Scully, Scott, Murphy & Presser, P.C.

(57) ABSTRACT

A computer-implemented system, platform, computer program product, tool, and/or method for re-running alert reports that includes: identifying an alert report to be rerun; collecting information on the alert report; gathering information on the configuration of a data analytics pipeline that generated the alert report; gathering data used to generate the alert report; recreating a regenerated data analytics pipeline based upon the information gathered on the configuration of the data analytics pipeline that generated the alert report; running the regenerated data analytics pipeline using the gathered data to create a rerun alert report; and optionally comparing the rerun to the original run including optionally generating a visual display of the results including in an aspect creating a side-by-side comparison of the tasks.

20 Claims, 8 Drawing Sheets

(56) References Cited

U.S. PATENT DOCUMENTS

| | | | |
|---|---|---|---|
| 2017/0300545 A1* | 10/2017 | Lee | G06F 8/34 |
| 2018/0150843 A1* | 5/2018 | Adjaoute | G06N 20/00 |
| 2020/0005308 A1 | 1/2020 | Snyder et al. | |
| 2020/0136889 A1* | 4/2020 | Chen | H04L 41/22 |
| 2020/0151565 A1 | 5/2020 | Widerhorn et al. | |
| 2022/0261247 A1* | 8/2022 | Muthuswamy | G06Q 20/4016 |

OTHER PUBLICATIONS

Massonet, P., et al., "A monitoring and audit logging architecture for data location compliance in federated cloud infrastructures" 2011 IEEE International Symposium on Parallel and Distributed Processing Workshops and Phd Forum, Date of Conference: May 16-20, 2011, 8 pages.

Hosseinpour, M., et al., "Process Deviation Categories in an Auditing Context" Available at SSRN 3280339, 2018, 37 pages.

Pourmasoumi, A., et al., "Business process mining", Encyclopedia with Semantic Computing, 2016, 8 pages, vol. 1, No. 1.

Rozinat P., et al., "Conformance checking of processes based on monitoring real behavior", Information Systems, Information Systems 33.1, pp. 64-95.

Stoop, J. J., et al., "Process Mining and Fraud Detection", Twente University, Thesis Dec. 2012, 68 pages.

* cited by examiner

SYSTEM AND METHOD TO REPLAY SUSPICIOUS ACTIVITY DETECTION PIPELINE IN RISK NETWORKS

FIELD

The present application relates generally to information handling and/or data analytics, and more particularly to methods, computer systems, platforms, tools, and computer program products for detecting suspicious activities and/or transactions.

BACKGROUND

There is a regulatory need for monitoring financial transactions and activity of account holders at financial institutions to detect any suspicious activities and/or behavior such as, for example, fraudulent financial transactions. There is also a regulatory need for monitoring insurance claim activity to detect any suspicious activities and/or behavior such as, for example, fraudulent insurance claims. Detecting activity indicative of fraudulent or criminal activity is increasingly difficult due to the large amount of data and information, such as, for example, numerous financial transactions, numerous parties/entities, and/or numerous insurance claims.

There have been developed electronic systems and data analytical processes to detect suspicious activity indicative of financial and/or insurance fraud, criminal behavior, and other suspicious activity. These advanced information and data analytics systems, platforms, and/or methods discover, define, and/or detect for example data patterns within relationship networks, for example, a large-scale network of financial transactions, insurance claims, and the like involving numerous parties and transactions, that are indicative of suspicious activity and behavior that may be indicative of fraudulent and/or criminal behavior.

In the financial and/or insurance scenario, the electronic systems and data analytical platforms and/or processes create alerts that are often reviewed by analysts and managers, each having different roles in the analysis and vetting process. In typical scenarios, new data is imported into the electronic data analytics system, for example a day's financial transactions and/or insurance claims, and electronic analytical processes are run for example on all the data, old and new data, and the electronic data analytics system generates alerts, if appropriate. The alerts can take many forms and generally will flag a person or incident that is suspicious and might require further review and analysis. The alert often goes to a case manager who reviews the alert, and if the alert is credible, then it might be investigated by an internal team, and if the internal team finds the alert credible then it a suspicious activity report or suspicious claim report might be prepared. In the financial crime investigation, the suspicious activity report or suspicious claim report might even be sent to governmental authorities or other analysts for review.

The financial crime investigation can take several months, for example 3-6 months and perhaps longer. During the investigation, the auditors can ask the financial institution, and/or supervisors could ask analysts and/or managers, to identify why there is a suspected fraudulent transaction, fraudulent claim, and/or fraudulent party. Currently, when such review of the suspicious activity report or suspicious claim report is required as part of the review process, it is not possible to replay and/or rerun the suspicious activity detection pipeline against the data and parties to explain how the original data and parties were analyzed in the suspicious activity detection pipeline to generate the suspicious activity report or the suspicious claim report. As such, it is not possible to explain the process and data points. The ability to replay or rerun the suspicious activity detection pipeline is not possible because the data and parties are constantly being updated and the suspicious activity detection pipeline is being modified. Moreover, the models change over time and the current code cannot be employed to replay the suspicious activity detection pipeline that was used when the original report was generated. It would be advantageous if during review, for example at later dates, and in circumstances months later, the suspicious activity detection pipeline that generated the report can be rerun and replayed so auditors and review analysts can explain how the report that detected the suspicious activity was generated.

SUMMARY

The summary of the disclosure is given to aid understanding of, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, the architectural structure, and their method of operation to achieve different effects. In this regard it will be appreciated that the disclosure presents and describes one or more inventions, and in aspects includes numerous inventions as defined by the claims.

In one or more embodiments, a system, platform, computer program product, tool, and/or method is disclosed for rerunning and/or replaying a suspicious activity detection pipeline that was used to prepare alert reports, and in an aspect permits the different data points to be checked to verify that the activity and parties still are indicative of fraudulent behavior. A system, platform, computer program product, tool and/or method, preferably a computer-implemented method, is disclosed for rerunning alert reports that in an embodiment includes: identifying an alert report to be rerun; collecting information on the alert report; gathering information on the configuration of a data analytics pipeline that generated the alert report; gathering data used to generate the alert report; recreating a regenerated data analytics pipeline based upon the information gathered on the configuration of the data analytics pipeline that generated the alert report; and running the regenerated data analytics pipeline using the gathered data to create a rerun alert report. In an aspect, the system, platform, computer program product, tool, and/or method further includes a pipeline replay module and/or is performed by a processor executing instructions in a pipeline replay module. The system, platform, computer program product, tool and/or method in an approach further includes clearing any pipeline configurations and data prior to recreating the regenerated data analytics pipeline.

In one or more embodiments, the system, platform, computer program product, tool and/or method further includes gathering the output of each task in the regenerated data analytics pipeline in response to running the regenerated data analytics pipeline using the gathered data to create the rerun alert report, and in a further aspect includes comparing the run through the regenerated data analytics pipeline using the gathered data to a previous run through the data analytics pipeline that generated the alert report and/or comparing the rerun alert report to the alert report. In an aspect, the system, platform, computer program product, tool, and/or method further includes performing a side-by-side comparison of the data used in the run through the regenerated data analytics pipeline to the data used in the previous run through the data analytics pipeline that generated the alert report, and/or performing a side-by-side comparison of tasks performed in the run through the regenerated data analytics pipeline to tasks performed in the previous run through the data analytics pipeline that generated the alert report. In an embodiment, the system, platform, computer program product, tool, and/or method further includes generating a visual display of the side-by-side comparison of the tasks performed in the run through the regenerated data analytics pipeline to the tasks performed in the previous run through the data analytics pipeline that generated the alert report.

The foregoing and other objects, features, and/or advantages of the invention will be apparent from the following more particular descriptions and exemplary embodiments of the invention as illustrated in the accompanying drawings.

BRIEF DESCRIPTION OF THE DRAWINGS

The various aspects, features, and embodiments of a system, platform, computer program product, tool, and/or method to rerun and/or replay the suspicious activity detection (SAD) pipeline used to generate one or more reports will be better understood when read in conjunction with the figures provided. Embodiments are provided in the figures for the purpose of illustrating aspects, features, and/or various embodiments of the systems, platforms, and methods, but the claims should not be limited to the precise arrangement, structures, features, aspects, systems, platforms, modules, functional units, instructions, assemblies, subassemblies, circuitry, embodiments, methods, processes, techniques, and/or devices shown, and the arrangements, structures, features, aspects, systems, platforms, modules, functional units, instructions, assemblies, subassemblies, circuitry, embodiments, methods, processes, techniques, and/or devices shown may be used singularly or in combination with other arrangements, structures, features, aspects, systems, platforms, modules, functional units, instructions, assemblies, subassemblies, circuitry, embodiments, methods, techniques, processes, and/or devices. It should be noted that a numbered element is typically numbered according to the figure in which the element is introduced, is generally referred to by that number throughout succeeding figures, and like reference numbers in the figures often represent like parts of the illustrative embodiments of the invention.

DETAILED DESCRIPTION

The following description is made for illustrating the general principles of the invention and is not meant to limit the inventive concepts claimed herein. In the following detailed description, numerous details are set forth in order to provide an understanding of the system, platform, tool, framework, computer program product, method, and/or techniques for rerunning a suspicious activity detection (SAD) pipeline that in an aspect generated an alert or otherwise indicated suspicious activities, claims, and/or transactions, however, it will be understood by those skilled in the art that different and numerous embodiments of the system, platform, tool, framework, computer program product, and its method of operation may be practiced without those specific details, and the claims and disclosure should not be limited to the arrangements, structures, systems, assemblies, subassemblies, platforms, framework, modules, tools, functional units, circuitry, instructions, embodiments, features, aspects, processes, methods, techniques, and/or details specifically described and shown herein. Furthermore, particular features, aspects, arrangements, structures, systems, assemblies, subassemblies, platforms, frameworks, modules, tools, functional units, circuitry, embodiments, instructions, methods, processes, techniques, details, etc. described herein can be used in combination with other described features, aspects, arrangements, structures, systems, assemblies, subassemblies, platforms, frameworks, modules, tools, functional units, circuitry, embodiments, instructions, techniques, methods, processes, details, etc. in each of the various possible combinations and permutations.

The following discussion omits or only briefly describes conventional features of information processing systems and data networks, including electronic data analytics programs or electronic risk assessment tools and/or systems configured and adapted to detect suspicious activity and generate alerts in connection with, for example, financial and/or insurance claim transactions, which should be apparent to those skilled in the art. It is assumed that those skilled in the art are familiar with data processing and data analytics including large scale data processing/analytics (also referred to as information/data processing systems) and their operation, and the application of data analytics, including data analytics systems, tools, platforms, and/or processes to detect suspicious activity that may be indicative of fraud and/or other criminal behavior.

Figure 1:
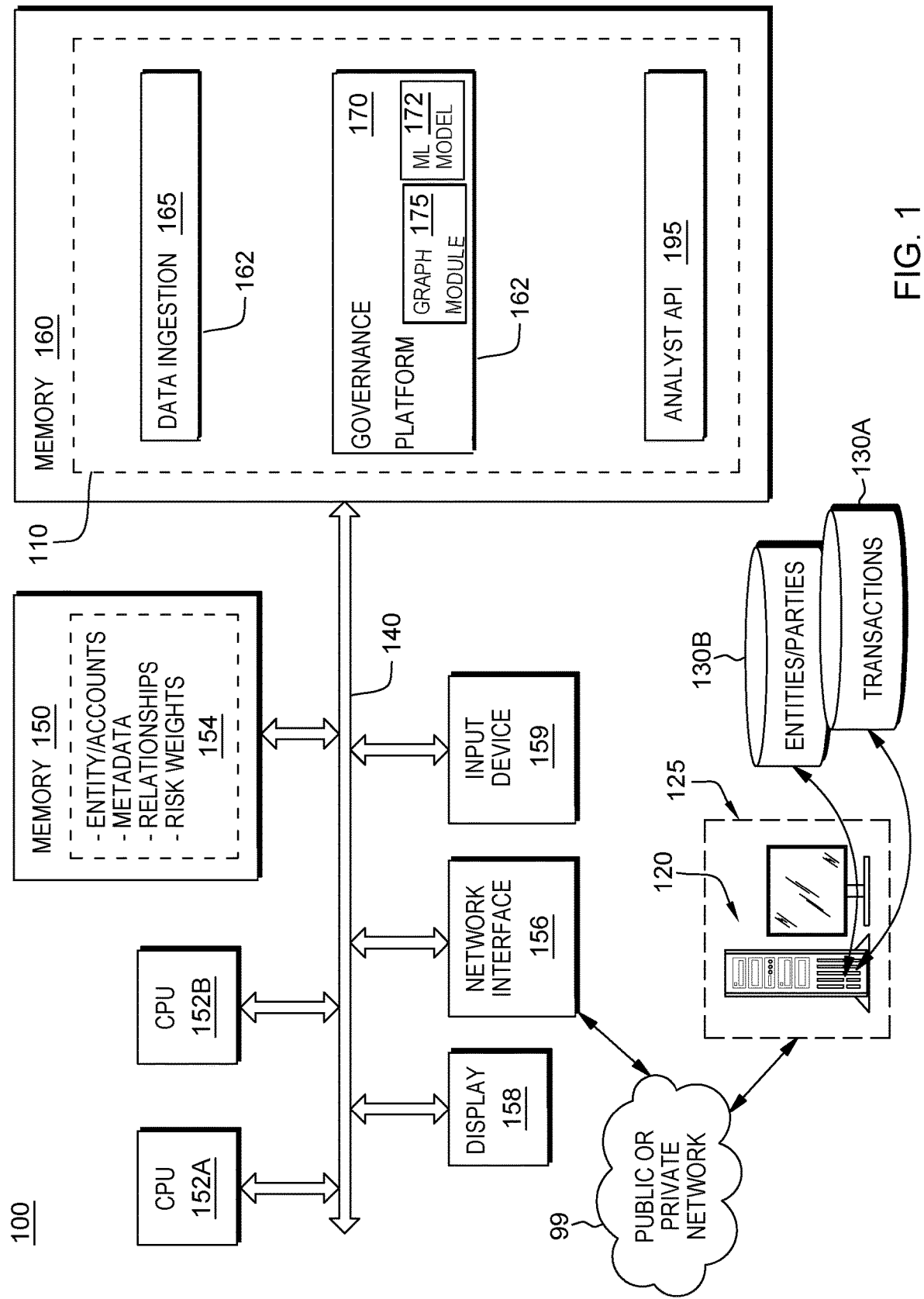
FIG. 1 schematically shows an exemplary computer system/computing device which is applicable to implement one or more embodiments of the suspicious activity and risk assessment tool of the present disclosure.

FIG. 1 illustrates an embodiment of an electronic risk assessment tool 100 implementing methods to detect suspicious activity in the domain of financial services, insurance claims processing, and related industries, e.g., insurance claim fraud and/or financial fraud detection. In embodiments, such a system tool 100 may be employed by or for a financial institution (e.g., a bank) or an insurance company who may issue, or a regulatory authority who may receive, an alert concerning a particular party, organization, and/or transaction(s). The alert may be issued by a financial institution against an entity or party who has been found to participate in suspicious activity, e.g., a bank has found suspicious activity undertaken by a given party, and reports this to the concerned authorities. In insurance fraud, an alert may be issued against an entity and/or insurance claim, and a "suspicious" entity may be a doctor, auto body shop, a claimant, or any party who may be placed on a "watch" list.

In the context of detecting financial fraud, e.g., fraudulent transactions as a result of stolen credit card credentials and/or insurance claim fraud, according to an embodiment, risk assessment tool 100 can be a computer system, a computing device, a mobile device, or a server configured to run risk assessment software applications and models. In some aspects, computing device 100 may include, for example, personal computers, laptops, tablets, smart devices, smart phones, or any other similar computing device, an embodiment of which is described in more detail in FIG. 13.

Risk assessment tool 100, also referred to as a system, includes one or more hardware processors 152A, 152B (also referred to as central processing units (CPUs), a memory 160, e.g., for storing an operating system, application program interfaces (APIs) and program instructions, a network interface 156, a display device 158, an input device 159, and any other features common to a computing device. In some aspects, risk assessment tool or system 100 may, for example, be any computing device that is configured to communicate with one or more networks 125 or web-sites 125 including a cloud-based server 120 over a public or private communications network 99. For instance, network or web-site 125 may include a financial institution that records/stores information, e.g., financial transactions occurring between numerous parties (entities) and electronic transactions. Network or web-site 125 can also include an insurance organization or syndicate that records/stores information, e.g., multiple insurance claims occurring between and involving multiple parties and multiple transactions. Such electronic transactions and/or claims can be stored in a database 130A with associated financial and/claims information while entity and party information can be stored in related database 130B. Further, as shown as part of system 100, there can be a local memory and/or an attached memory storage device 150, or a remote memory storage device, e.g., a database, accessible via a remote network connection for input to the system 100.

In the embodiment depicted in FIG. 1, processors 152A, 152B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 152A, 152B are configured to execute instructions as described below. These instructions may be stored, for example, as programmed modules in an associated memory storage device 160.

Memory 160 may include, for example, non-transitory computer readable media in the form of volatile memory, such as random-access memory (RAM) and/or cache memory or others. Memory 160 may include, for example, other removable/non-removable, volatile/non-volatile storage media. By way of non-limiting examples only, memory 160 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. Display 158 optionally may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system as a risk assessment tool 100 for detecting suspicious activity, e.g., financial fraud, and creating alerts, the local or remote memory 150 may be configured for storing information and associated meta-data 154. Such captured and stored data can include but is not limited to: parties, accounts, transactions, relationships, and associated metadata obtained from transactions, claims, and/or data stored in the electronic databases 130A, 130B. Alternately or in addition, the entity data, entity relationships, transactional data and meta-data 154 can be stored in a separate local memory storage device attached to the computer system 100.

Memory 160 of system 100 in one or more embodiments stores tools, and/or platforms that include or constitute one or more modules 162 having programmed instructions adapted to perform risk assessment as it relates to detecting suspicious activity, e.g., financial fraud, money laundering, insurance fraud, and creating alerts.

In an embodiment, one of the programmed processing modules 162 stored at the associated memory 160 include a data ingestion module 165 that provides instructions and logic for operating circuitry to access/read large amounts of data (e.g., parties, accounts, transactions, claims data) for use by other modules that process and analyze the data to form and output alerts. In one or more embodiments, the input data for data ingestion module 165 comprises parties, accounts, transactions, claims, etc. For example, where a financial institution, such as for example a bank, desires to determine if there is a money laundering scheme or other fraud, for example as a result of governmental oversight, or regulations, such as for example anti-money laundering (AML) laws, the input data can comprise: the transactions occurring with or being processed by the financial institution; the parties to any financial transaction with or through the financial institution; and account information (the customers) of the financial institution. In the case of an insurance organization and the like, the input data can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing the motor vehicle, physician treating patient, etc. The examples above are not limiting and there can be other situations where the system/tool/platform will have application, and additional or other input data can be provided.

In an embodiment, memory 160 includes an Analytics and Governance Platform 170 that provides instructions and logic for operating circuitry to process and analyze data, typically large amounts of data, to form and output alerts. Analytics and Governance Platform 170 (also referred to as Governance Platform 170, Platform 170, Framework 170, Tool 170, or Module 170) preferably contains one or more models to determine a fraud risk probability based on the variables, and/or data. Based on the data and the models, Governance Platform 170 produces insights, alerts and/or reports, an analyst can analyze the insights and/or alert, and the analyst can provide feedback as to a potential risk level of a party, transaction, and/or claim.

Governance Platform 170 can contain and call up one or more models to process and analyze the data and provide associated alerts for review by an analyst. Governance Platform/Module 170 can include and invoke, for example, supervised (or unsupervised) machine learning (ML) techniques through, for example, ML Model Module 172, for detecting suspicious activity indicative of criminal activity, e.g., fraud, as known in the art, e.g., supervised learning using a regression model to predict a value of input data (classification) and unsupervised learning (clustering) techniques. The Governance Platform 170 in an embodiment can include a Risk-by-Association analyzer that provides instructions and logic for operating circuitry which can run a probabilistic risk model to generate risk-by-association analysis scores. In an embodiment, another optional processing module 162 stored in the associated computer memory 160, and in an aspect as part of the Governance Platform 170, is a pattern determination module or model that employs logic and instructions for detecting any data patterns indicative of suspicious activity or behavior in the transaction network that is indicative of criminal and/or fraudulent activity. Based on features and metadata relating to a party, transactions, claim data, environmental data, industry data, location data, other data, and changes to the data that are captured, techniques employing Hidden Markov Models or Artificial Neural Networks may alternatively or additionally be employed to compute a risk associated with a particular party, a transaction, claim, and/or changes in data states. Machine learning (ML) Model Module 172 is shown as included within the Governance Platform 170 but can be a separate module/model from the Governance Platform 170.

In an embodiment, Governance Platform 170 includes an optional graph and build module/model 175, e.g., in memory 160, and provides instructions and logic for operating circuitry to form/build graphs, e.g., relationship networks, for use in producing alerts and accessing risk, and/or read data from graphs. Graph build module 175 is shown as included within the Governance Platform 170 but can be a separate module/model from the Governance Platform 170. Other modules or models can include further rules models. Further details and explanation of the Governance Platform 170 is discussed below, and the Governance Platform 170 is not limited to the modules or models discussed above and any number of models/modules can be used in the Governance Platform 170.

In an aspect, the ingestion module 165 would load the received input data, the Governance Platform 170 determines from the input data, which may, for example, be party data, account data, transaction data, claim data, industry data, geographical data, and other data, including metadata, various insights and whether to issue an alert. In most instances, large amounts of data are input and processed by the data ingestion module 165. Memory 160 optionally includes a supervisory program having instructions for configuring the system 100 to call or invoke one or more, and in an embodiment all, of the program modules and invoke the suspicious activity detection operations of the risk assessment tool 100. In an embodiment, the supervisory program calls methods and provides application program interfaces (APIs) for running Governance Platform 170 for generating reports and/or alerts using the data ingested by the data ingestion module 165.

At least one application program interface (API) 195 is invoked in an embodiment to receive input data from a user, e.g., a domain expert trained in finance/financial matters particularly in the context of detecting criminal and/or fraudulent activity. Via API 195, the analyst receives reports and/or alerts. The analyst reviews the alert, including the insights, and in an embodiment can provide feedback information to either escalate or close the investigation of a particular party, transaction, etc. depending on the risk. Further investigation can lead to the issuance of a suspicious activity report and/or suspicious claim report.

Figure 2:
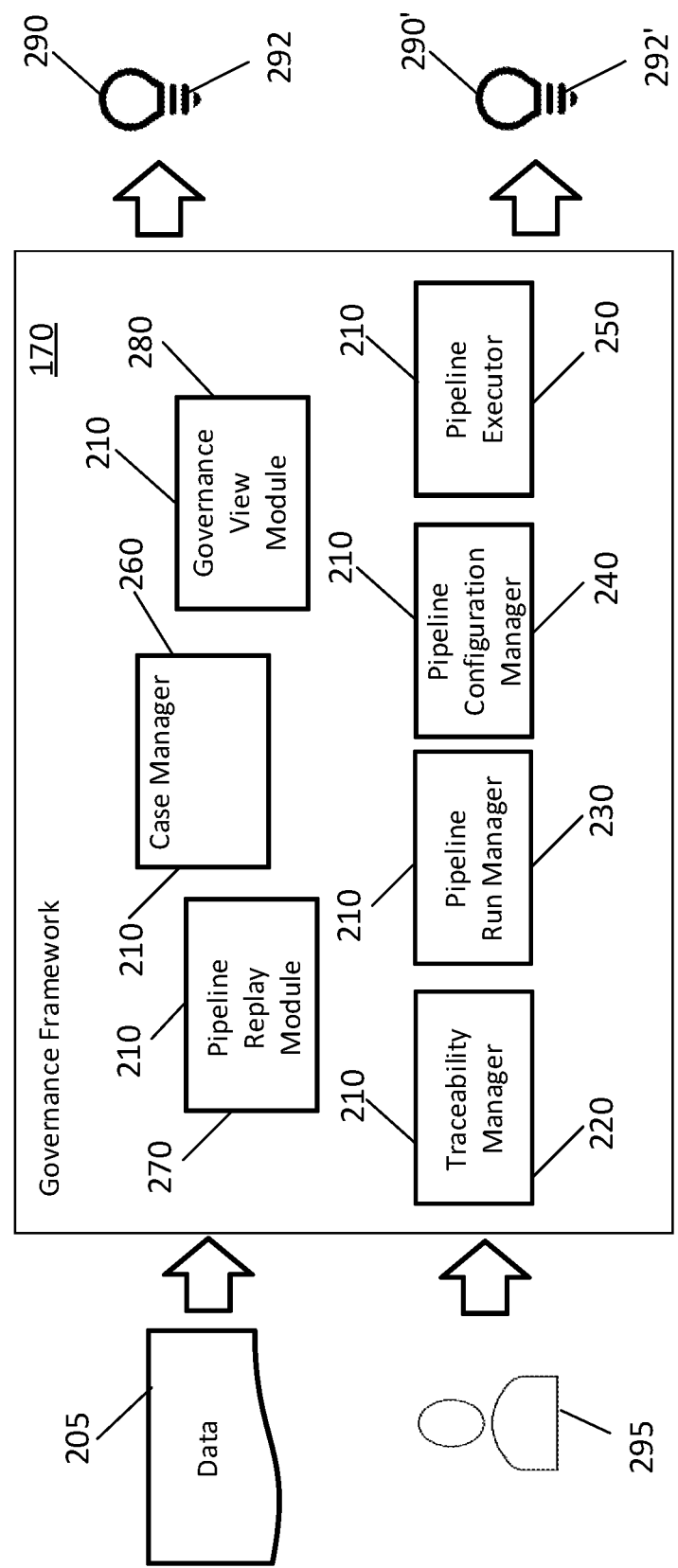
FIG. 2 schematically illustrates an overview of a system/module to run electronic data analytics programs to generate alerts to suspicious activity in accordance with an embodiment of the present disclosure and in an aspect to rerun or replay a suspicious activity detection execution pipeline.

FIG. 2 discloses further details about the Governance Platform 170, sometimes also referred to as System 170, Tool 170, or Governance Framework 170, that is designed and configured to generate insights and/or an alert, and as discussed in further detail can be configured to rerun the suspicious activity detection (SAD) pipeline that generated the one or more insights and/or alert at a later time, for example, for review by analysts. For purposes of clarity FIG. 2 discloses functional units 210 for the system 170 while eliminating some of the details, specifics, and features of the Governance Framework 170 and the System 100 in FIG. 1. The functional units 210, and/or processing units associated with the functional units 210, contain instructions and/or logic for operating circuitry to perform the respective functions and operations of the functional units. For example, the functional units 210 contain instructions and/or logic executable by circuitry, for example in a processor, computer, server, etc., to perform one or more of the process steps performed by the functional unit.

Module 170 in the embodiment of FIG. 2 discloses functional units 210 including Traceability Manager 220, Pipeline Run Manager 230, Pipeline Configuration Manager 240, Pipeline Executor 250, and Case Manager 260. Pipeline Configuration Manager 240 configures and maintains a suspicious activity detection (SAD) Pipeline 300 (See FIG. 3) by, for example, determining what models/tasks to call, what data 205 to use, and how to use the data 205. The configuration can be captured in a table or as a JSON object. Pipeline Configuration Manager 240 also maintains the revisions of the pipeline configurations such as, for example, what version, who modified/created the SAD pipeline version, and when the pipeline version was modified/created. Pipeline Configuration Manager 240 maintains details of the SAD pipeline such as input data, the pipeline flow, which filters are used and their versions, which transform functions are used and their versions, which models are used and their versions, which code/module are used and their versions.

Pipeline Executor 250 executes the SAD pipelines, including reading the pipeline configuration, its version, and executes the tasks/steps in the pipeline. Pipeline Executor 250 updates the execution pipeline run configuration and runs the Pipeline 300 task-by-task to generate and output insights 292 and/or alerts 290. The Pipeline Run Manager 230 maintains the run details, e.g., for each pipeline. The Pipeline Run Manager 230 manages and tracks what programs/models are run, including when and what is run each time a pipeline run is executed, such as, for example, when the pipeline run started and completed, the outcome or result of the run. The Pipeline Run Manager 230 knows the runtime information of any given pipeline and can be used to find which runs are impacted for a given change. The Traceability Manager 220 maintains the traceability of different artifacts in the system. The Traceability Manager 220 can help to identify the pipeline runs for a given alert by tracing the alerts and what models, programs, filters, data, transform functions, insights and/or events were used to generate the alerts 290. The Case Manager 260 manages the various functional units 210, and in an embodiment is an application which is typically used by a user or analyst to review the alerts generated by the system. If the alert is suspicious enough, in an aspect it can be moved to an investigation queue, or if the alert is a false positive, the analyst or supervisor can close the case.

The Module 170 uses the functional units 210 to generate and run the SAD pipeline to prepare alerts 290 based upon data 205 ingested and/or received into the system 200. For example, the Module 170 receives additional data on a periodic basis, such as, for example, every evening. The Module 170 through input from an analyst or other user, or optionally as part of a program, selects programs or models to run in order to generate alerts 290. The Module 170 that generates alerts 290 can take many forms and can have more or less functional units 210 than described in connection with FIG. 2. The Module 170 can be run to generate alerts on a periodic basis, such as, for example at predetermined times, and/or manually by a user 295, immediately or any desired time.

Figure 3:
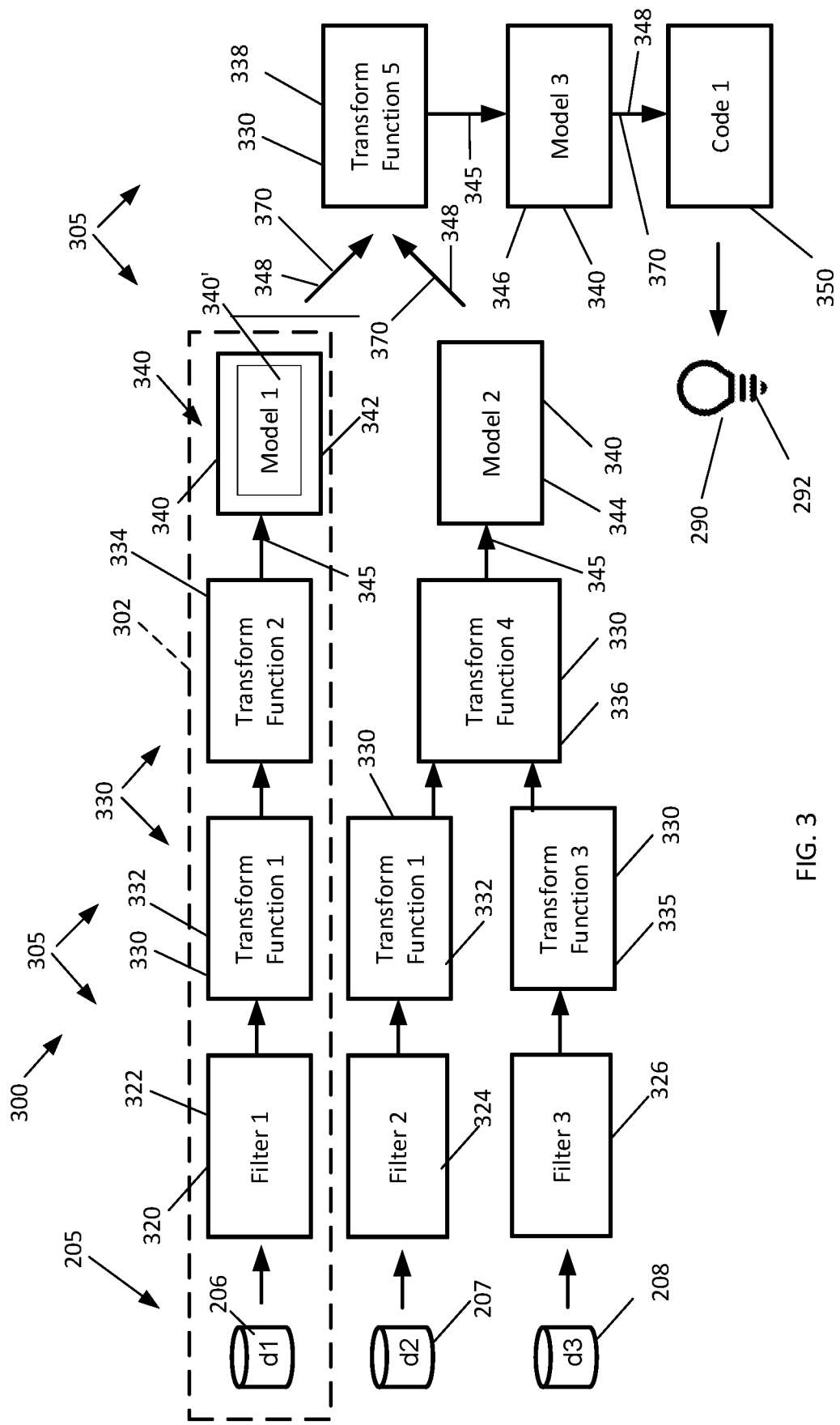
FIG. 3 illustrates a block diagram of a Suspicious Activity Detection execution pipeline created, for example by the system/module of FIG. 2, for processing and analyzing data according to an embodiment of the present disclosure.

FIG. 3 illustrates a suspicious activity detection (SAD) (e.g., fraud detection) execution pipeline 300 generated and/or created by Governance Platform 170. Pipeline 300 in an embodiment includes receiving and/or ingesting data 205, illustrated as data subset 206 (d1), data subset 207 (d2), and data subset 208 (d3) in FIG. 3, where for example d1 data subset 206 represents parties, d2 data set 207 represents transactions, and d3 data set 208 represents claims. It can be appreciated that the amount of data can and likely is much larger and numerous than the data 205 illustrated in FIG. 3. The execution pipeline can include one or more tasks 305, for example one or more filters 320, one or more Transform Functions 330, one or more Models 340, and one or more Code Units 350 to process the data 205 and produce, generate, and/or output an Alert 280. The execution pipeline 300 illustrates a flow that takes data as an input and performs a number of tasks 305 to process the data to generate an output 290, which can optionally include one or more insights 292.

Execution pipeline 300 includes one or more filters 320, illustrated as Filter 1 (322), Filter 2 (324), and Filter 3 (326) in FIG. 3, that are applied to the data 205, e.g., to data d1 (206), data d2 (207), and data d3 (208). Filters 320 process the data 205 or data subsets (e.g., 206), for example, by filtering rows and columns, to obtain the desired data or data subsets in, for example, the desired format. Different filters 320 can be applied to different data as shown in FIG. 3, the same filter 320 can be applied to different data, or the different filter 320 can be applied to the same data. The detection pipeline 300 can apply one or more transform functions 330 which further process and transform the data. One example of a transformation function 330 can be an "aggregate" function, which aggregates the physical damages or injury bills against a particular claim. Another example can be a simple function which computes whether the loss date is a weekday or a weekend, and whether during business hours or after business hours. In pipeline 300, the Transform Functions 330 are Transform Function 332 (Transform Function 1), Transform Function 334 (Transform Function 2), Transform Function 335 (Transform Function 3), Transform Function 336 (Transform Function 4), and Transform Function 338 (Transform Function 5). More or less Transform Functions 330 can be used in detection Pipeline 300.

Different incident models 340 can be applied in execution pipeline 300. The one or more filters 320 and one or more Transform Functions 330 generate one or more feature sets 345 that are input and/or submitted to the one or more models 340. The one or more features or feature sets 345 includes data 205 that has been filtered, selected, and transformed into a form for use by the selected model 340. In other words, the various models 340 desire and/or require certain data in a certain format in order to run and generate an output 348. In execution pipeline 300, for example, the feature 345 (e.g., feature 1) output from Transform Function 334 is fed into Model 342 (Model 1) to generate output 348.

The models 340, also referred to as programs 340, in one or more embodiments receive input as feature set 345 and will output or generate, depending upon the amount of processing performed by the model, insights 370, alerts 290, and/or values (data) 348 that can, for example, be further processed to create insights 370 or alerts 290. In an embodiment, the output from the Module 170 and/or detection pipeline 300 is an alert 290, and the alert 290 in one or more aspects is output directly from the one or more models 340. Additionally, or alternatively, the output from the one or more models 340 can be one or more insights 370 that are used to generate one or more alerts 290. The models 340 can be, for example, a risk-by-association analyzer, a pattern determination model, a rules model, a machine learning (ml) model, etc. More or less models 340 are contemplated, and pipeline 300 is illustrated with three models 340, e.g., Model 342 (Model 1), Model 344 (Model 2) and Model 346 (Model 3).

In a further embodiment, the one or more models 340 can produce values (output 348) used to replace variables in a narrative template to create insights 370, and/or values that can be used to generate an alert 290. That is, based upon the model output 348, the detection pipeline 300 and/or Module 170 (e.g., a Transform Function 330 and/or a further model 340) can replace the variables in a narrative and provide the resulting narrative as an insight 370. For example, after applying the one or more models 340 the data output 348 from the model 340 may undergo further processing and manipulation by further transform function(s) 330, and by one or more models 340, to produce one or more insights 370. In one or more embodiments, because the model output 348 is technical output and users of the system typically respond to text language, e.g., sentences, that they can understand, the model output 348 can be run through a further optional Transform Function and/or a further model to construct a narrative referred to as an insight 370. In pipeline 300, for example, the output 348 from Models 342 and 344 are received by Transform Function 338 which further processes the data for insertion into a narrative where the output from Transform Function 338 is received by Model 346 as input features 345 where Model 346 inserts the values from Transform Function 338 into the narrative and Model 346 outputs one or more insights 370. As a further example, a model 342 returns two values [Cluster A, 10] where A is the cluster ID and 10 is the number of frauds in the cluster. Model 342 or another Model can place or substitute the output values 348 from model 342 into a narrative template to produce an insight 370. So where the narrative template is defined as "Party <party_id> is in Cluster <cluster id> which contains <Number_of_fraud_parties> parties", the model 342 or another model will take the values and produce the insight, "Party A is in cluster A which contains 10 fraud parties" as an insight 370 output by model 342 or another model.

Optional Code 350 in pipeline 300 may be applied to further convert the data. For example, code 350 can be a look-up table to score the output of the case. Model 346 (Model 3) in pipeline 300 can output a numeric score or value and Code 1 350 can determine if the numerical score or value is above a threshold, and if so can generate or output an alert 290. It should be recognized that the output of the pipeline 300, or the model 340 may be in the form of "low" risk, "medium risk", or "high" risk, but it should be recognized that the output can be in other forms or formats. In one or more embodiments, input data 205 is fed into the governance platform 170, and in an embodiment into detection pipeline 300, where the input data 205 is converted into features 345 that are fed into one or more models 340 where in one or more aspects the one or more models 340 generate an output 348 as one or more insights 292, and one or more insights 292 are used to generate an alert 290.

It should be recognized that Detection Pipeline 300 can include one or more execution pipelines, or sub-branches 302 that performs one or more tasks 305. For example, Filter 322 (Filter 1), Transform Function 332 (Transform Function 1), Transform Function 334 (Transform Function 2), and Model 342 (Model 1) illustrates execution sub-pipeline 302. Each sub-pipeline 302 can have different task/functional units that undergo different tasks 305, e.g., different filters, different transform functions, and/or different models, but can also share filters, transform functions, models, and data. For example, in the insurance industry, the Governance Platform 170 can produce an auto insurance pipeline, a worker's compensation pipeline, a property-loss pipeline, and/or a medical provider pipeline, to name just a few. Each pipeline will take or use different data and perform different tasks 305 to process the data differently to identify potential suspicious activity. For example, the auto pipeline takes all auto insurance claims as input data and the worker's compensation pipeline is fed with worker's compensation claims.

The Pipeline Configuration Manager 240, based upon the user input or via the program, selects what models 340 and/or programs to call, what data or data subsets to use and how to use the data; the Pipeline Run Manager 230 manages and oversees the models and programs that are run; while the Pipeline Executor 250 runs the pipeline task-by-task to generate one or more alerts 290. The Traceability Manager 220 tracks and records how the alerts 290 were generated matching the alert 290 with, for example, the data 205, filters 320, models 340, insights 370, events, and transform functions 340 used to generate the alert 290 so that the alert 290 is traceable. For example, the Traceability Manager 220 may have one or more tables identifying the various runs executed by the Governance Platform 170, the pipelines, and the data sets used.

Figure 4:
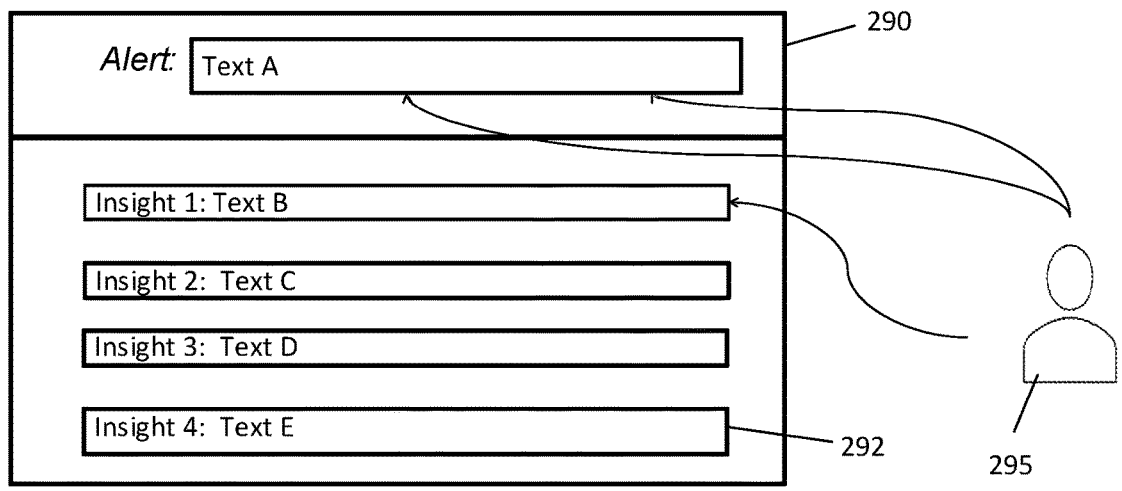
FIG. 4 diagrammatically illustrates an alert and associated insights generated by running the pipeline of FIG. 3 generated by the system/module of FIG. 2 according to an embodiment of the present disclosure.

A user 295, e.g., analyst, typically reviews the alert 290 output by the SAD pipeline 300 to determine how to proceed, and, in particular, typically reviews the insights 292 and/or events that lead to the alert 290 being generated in the particular case in order to determine how to proceed. An embodiment of a display of an alert report 290, with the supporting insights 292, is shown in FIG. 4. The alert 290 typically relies upon one or more insights 292, and the alert or report 290 is typically presented with the insights 292 which form the basis for the alert 290. For example, insight 1 could be that the average number of transactions has changed by twenty percent (20%); insight 2 could be that the customer is part of a high-risk cluster which has a number of known frauds; insight 3 could be that the transactions are associated with a high-risk geographic zone; and insight 4 could be that there was extended inactivity in the account before the recent transactions. The Governance Module 170 for example can have a Case Manager 260 that contains the alerts 290 and/or insights 292, and the user or analyst 295 opens the Case Manager Program 260 and reviews the alerts 290, and insights 292. The analyst 295 reviews the alert 290 and/or insights 292, and determines how to proceed, including for example to close the alert 290 if the alert 290 is believed to be a false positive, or if it is believed that there is likely some fraud and needs further investigation the case can be escalated to "investigation". In instances the analyst can decide whether to bring the alert 290 to a supervisor or manager to determine what actions to take.

In situations where the Governance Platform 170 generates one or more SAD detection pipelines that generate one or more alerts, further investigation can include many layers of review and/or take time to process, including in situations can take as long as 3-6 months, and even longer. During such investigations, auditors often desire and/or need to review why a given transaction, party, and/or claim was flagged as suspicious. It would be advantageous to rerun and/or replay the suspicious activity detection process that generated the original insights 292 and/or generated the report 290, e.g., flagged the party, transaction, and/or claim as potentially suspicious and/or fraudulent. The problem is that models 340 have changed, new data 205" has been added, and code has changed since the original SAD pipeline 300 was run with the original data 205 that generated the original alert 290 and insights 292 upon which the alert 290 is based.

A system, platform, tool, computer program product, and/or method is disclosed that permits a user 295, e.g., an analyst, to replay and/or rerun the suspicious activity detection (SAD) pipeline using the data at the time of the original run of the SAD pipeline to review and confirm the insights 292 and alerts 290. Turning to FIG. 2, Governance Framework 170 to replay the SAD pipeline 300 at a later date is disclosed, for example, to facilitate review and analysis of the results, e.g., the insights 292 and/or alerts 290, generated by the SAD pipeline 300. The governance Framework 170 includes functional units 210, such as, for example, Pipeline Replay Module 270 and Governance View Module 280, in addition to functional units 210 described earlier, e.g., Traceability Manager 220, Pipeline Run Manager 230, Pipeline Configuration Manager 240, Pipeline Executor 250, and Case Manager 260. Pipeline Replay Module 270 and Governance View Module 280 contains instructions and/or logic for operating circuitry to perform respective functions, tasks, and/or operations of the respective functional units. Other functional units 210, for example, Pipeline Configuration Manager 240 and Pipeline Run Manger 230 are involved in regenerating the SAD pipeline 300 and running the regenerated SAD pipeline 300', and in an aspect include additional instructions and/or logic for operating circuitry to perform the additional functions, tasks, and/or operations.

In one or more embodiments, Pipeline Replay Module 270 clears the pipeline configuration and data to regenerate the original pipeline and use the original data that generated the insights and alert for review and replay. Pipeline Configuration Manager 240 identifies the pipeline configuration for any given case/alert that needs to be rerun and/or replayed, and Pipeline Run Manager 230 reruns the identified pipeline configuration, using the original input data that is gathered for the given case/alert 290, and regenerates the output, e.g., the results which can include the alert 290' and/or insights 292' supporting the alert 290. Pipeline Governance View Module 290 permits user 295 to check the previous results 290 with the current result 290', including the tasks 305 and insights 292', to confirm that no tampering or bias is present in the process and/or Governance Platform 170 in system 100.

Figure 5:
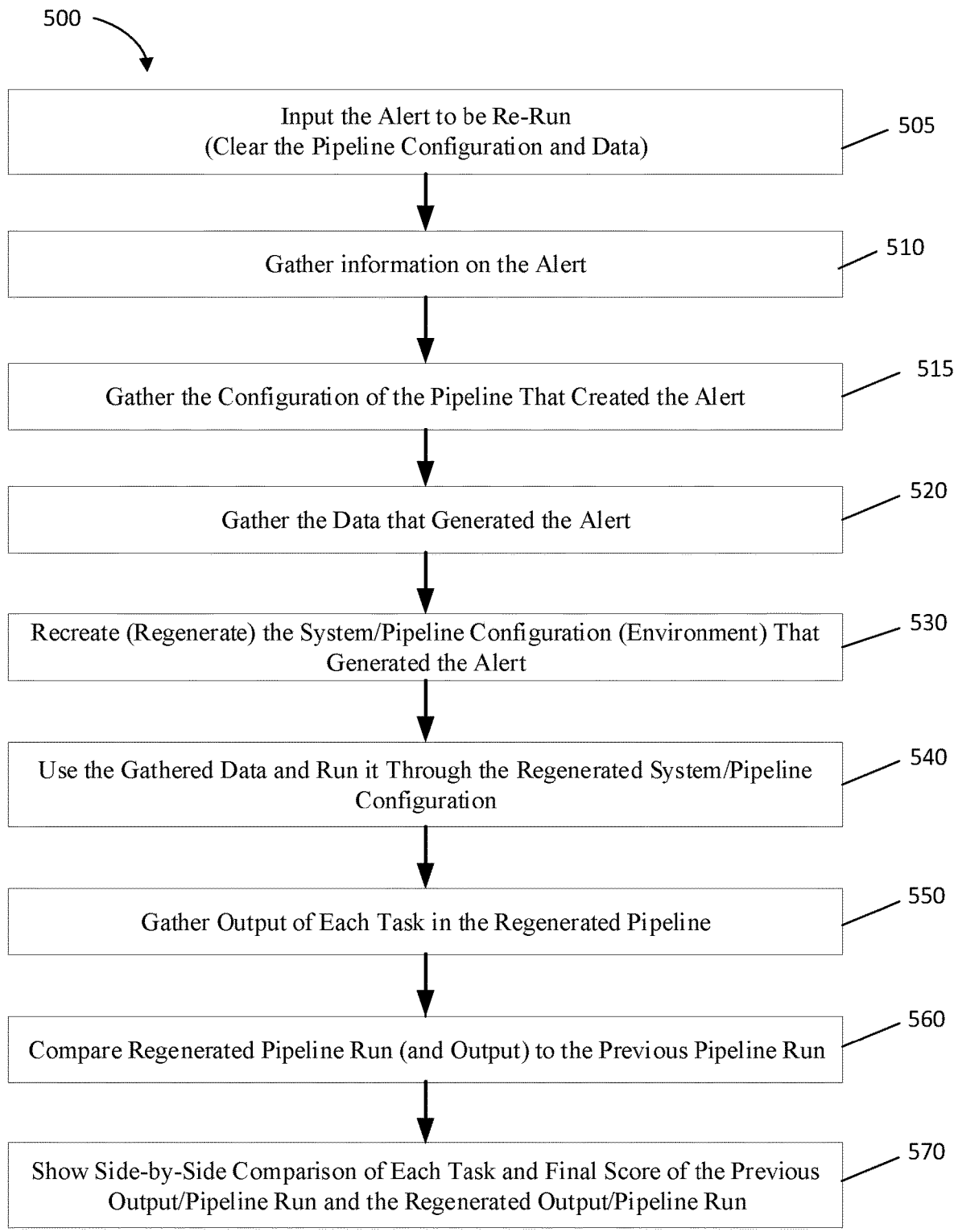
FIG. 5 illustrates a diagrammatic flowchart of a method of rerunning a suspicious activity detection pipeline according to an embodiment of the present disclosure.

FIG. 5 is an exemplary flowchart in accordance with one embodiment illustrating and describing a method 500 of replaying an Alert, for example, at a later date, to confirm the findings, steps, tasks, and/or insights generated as part of a review process. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

As part of the review process 500, a user 295, e.g., an analyst, can decide to re-run and/or replay the alert generation process. At 505 the alert to be re-run is input into Governance Framework Module 170, for example into the Pipeline Replay Module 270. For example, in the case of insurance claims, a claim number (e.g., No C1234) was scored high as a potential fraud on Jan. 1, 2021, and on May 1, 2021 an analyst and/or user desires to re-run the scoring process that resulted in the alert for the claim number C1234. At 505, the input can be an alert identification number, an insurance claim number (for example claim No. C1234), or other identifier to indicate the insights, alerts, results, and/or or output for review and/or replay. The insurance claim No. C1234 in an example embodiment is input into the Pipeline Replay Module 270, which in an approach performs the function of re-running (rescoring) the alert and/or claim. As part of the process of inputting the alert (e.g., the insurance claim No. and/or alert No.) to replay and/or re-run the alert, any current pipeline configurations and/or current data can be cleared at 505 as part of or before the process 500 of replying the alert. In an embodiment, the Pipeline Replay Module 270 can clear any current suspicious activity detection pipeline configurations and/or current data.

At 510 information on the original alert/claim is gathered. The alert generated by the claim (e.g., Claim No. C1234) typically has an alert identification number and the alert identification number and information on the alert in an embodiment are collected at 510. For example, in the insurance field, the alert will include the claim number already referred to, and can additionally include the date on which the system generated the alert. This task of collecting further information and/or details is typically performed by the Pipeline Replay Module 270, which may include involving the Case Manager 260 to pull the details of the alert (such as the alert date and claim number). At 515, the configuration of the suspicious activity detection pipeline that created the original alert is obtained, collected, and/or gathered. The system configuration that created the alert is collected at 515. In one or more embodiments, the pipeline JSON, which contains all the tasks (and module objects) in the pipeline and the sequence of the flow that generated the alert are collected. In an aspect, the Pipeline Replay Manager 270 invokes the Pipeline Configuration Manager 240 to obtain, gather, and/or collect the system/pipeline configuration that generated the alert on that date. The Pipeline Replay Manager 270 also invokes the Pipeline Run Manager 230 to obtain, gather, and/or collect the run details of the pipeline that generated the alert, such as, for example, the input and output of the suspicious activity detection pipeline on that date.

At 520, obtain, gather, and/or collect the data that was used in the suspicious activity detection pipeline that generated the alert. In an embodiment, at 520 the Pipeline Replay Manager 270 invokes the Pipeline Run Manager 230 to obtain, gather, and/or collect details and metadata about the input and/or output of each job, step, and/or task which is used to pull the respective data objects from the system. At 530, the environment, including a suspicious activity detection pipeline configuration 300' intended to be identical to the suspicious activity detection pipeline 300 that generated the original alert, is created. The Pipeline Run Manager 230 after gaining information about the configuration of the original suspicious activity detection pipeline 300 uses the information to create the environment, e.g., regenerated suspicious activity detection pipeline 300', at 530. For example, the necessary containers with the configuration used on the date of the original alert (e.g., Jan. 1, 2021) are created and are made ready to run the regenerated pipeline. For example, at 530 spark containers, python containers, and/or service containers are readied. At 540, the gathered data (e.g., gathered data 205') is run through the regenerated system/pipe (e.g., pipeline 300'). That is, in response to the environment (e.g., regenerated system/pipeline 300") being readied, the gathered data is used and run through the regenerated system configuration (pipeline 300') at 540. In an embodiment, at 540, the Pipeline Run Manager 230 pushes the data used in the original suspicious activity detection pipeline 300 (e.g., pipeline created on Jan. 1, 2021) to a hot folder to trigger the scoring process (e.g., running of the newly regenerated suspicious activity detection pipeline 300') for the claim. With reference to FIGS. 2 & 3, the data is data 205, e.g., data d1 206, data d2 207, and data d3 208, which was used on the day of the alert, e.g., data from Jan. 1, 2021. In the insurance claim context, the data would be, for example, the claim date, the incident details, injury details, involved party details, account holder details, etc., for that particular claim C1234. In an embodiment, at 540, the Pipeline Run Manager 230 is invoked by the Pipeline Replay Module 260 to execute the regenerated suspicious activity pipeline 300' with the data 205'. It can be appreciated that the regenerated suspicious activity detection pipeline 300' regenerated at 530 and running of the regenerated suspicious activity detection pipeline 300' at 540 can be performed in the same manner using the Governance Framework 170 and functional units 210 as the original run of the original suspicious activity detection pipeline that created the alert being reviewed.

At 550 the output of each task in the regenerated suspicious activity detection pipeline 300' is gathered and at 560 the output 290' and insights 292' of the regenerated suspicious activity detection pipeline 300' are compared to the output 290 and insights 292 of the original suspicious activity pipeline 300. At 570 a side-by side comparison of each task 305 (and the final score/pipeline configuration) of the previous/original pipeline run that generated the alert being reviewed to each task 305' (and the final score/pipeline configuration) of the regenerated pipeline run is performed, and in an aspect is visualized as an output that can be displayed. In a further optional aspect at 570 a side-by-side comparison of the input data 205 used in the original suspicious activity detection pipeline run to the input data used in the regenerated suspicious activity detection pipeline run. Preparing and running the regenerated suspicious activity detection pipeline 300' permits confirmation that the score can be reproduced with the same data and same configuration and that there was no tampering.

Figure 6:
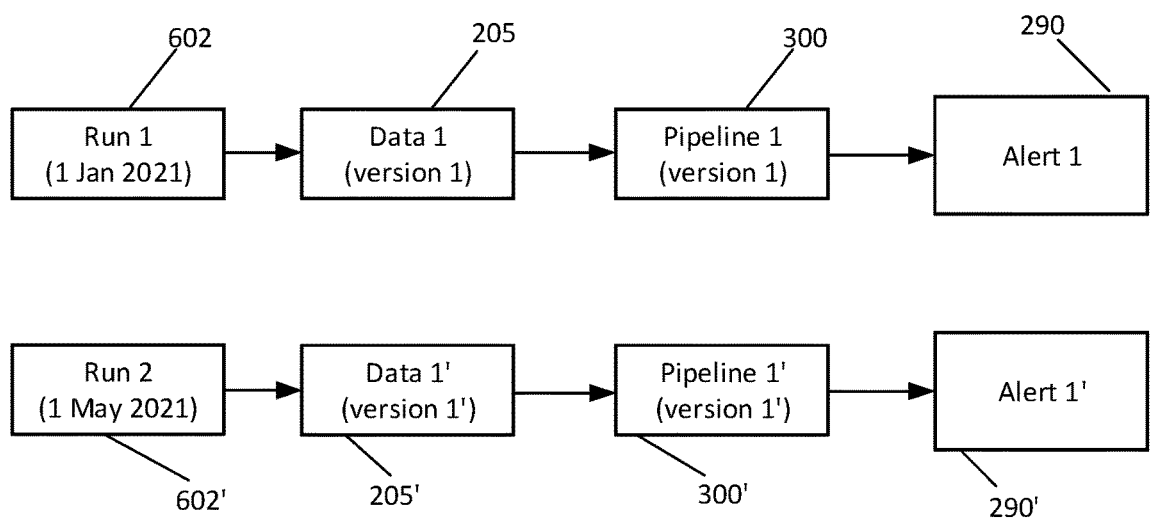
FIG. 6 schematically illustrates an overview of a comparison of an original Alert generated by a run of original suspicious activity detection pipeline using original data with a regenerated Alert generated by a run of a regenerated suspicious activity detection pipeline to gathered data according to an embodiment of the present disclosure.
Figure 7:
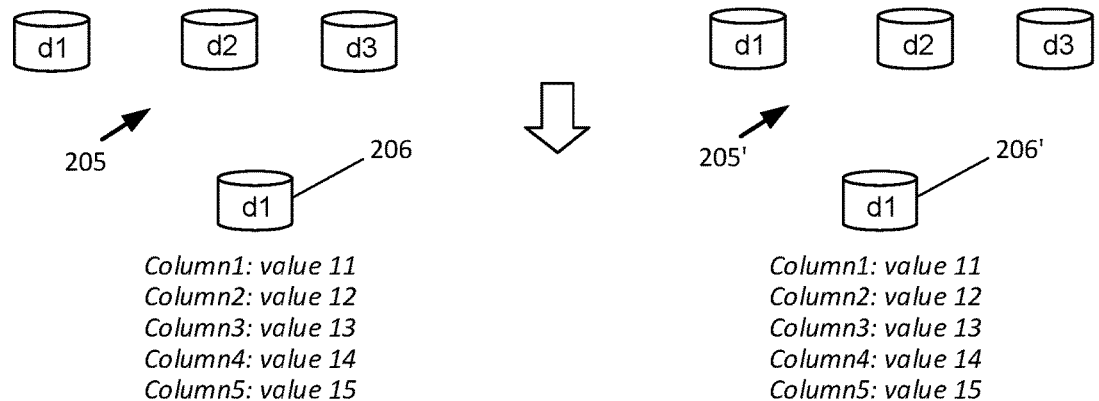
FIG. 7 depicts a diagram representing a comparison of original data used in original suspicious activity detection pipeline to gathered data used in regenerated suspicious activity detection pipeline according to an embodiment of the present disclosure.

FIG. 6 depicts an overview schematic illustration of original alert 290 generated by an original run 602 of SAD pipeline 300 with data 205 performed on Jan. 1, 2021 being compared to the re-played alert 290' generated by the run 602' of the regenerated SAD pipeline 300' with data 205' on May 1, 2021. At 560 in process 500, the original run 602 can be compared to re-run 602'. FIG. 7 shows an overview schematic illustration comparing the original data 205 used in original run 602 of original pipeline 300 to the gathered data 205' used in the run 602' of the regenerated pipeline 300', and more particularly the comparison of data d1 206 with data d1 206'. FIG. 7 illustrates all the data 206 is compared to all data 206', and it can be appreciated that all data 205 is compared to data 205' in a similar manner. It can be appreciated that the comparison illustrated in FIG. 7 can be part of process 500 and can be performed as part of 570 and/or 560. The comparisons of 560 and 570 can be facilitated by Governance View Module 280, which permits users to check the previous result (e.g., alert, pipeline, tasks, data, etc.) to the current re-run result (e.g., regenerated alert, pipeline, tasks, data, etc.) to ensure there is no bias or tampering in the system.

Figure 8:
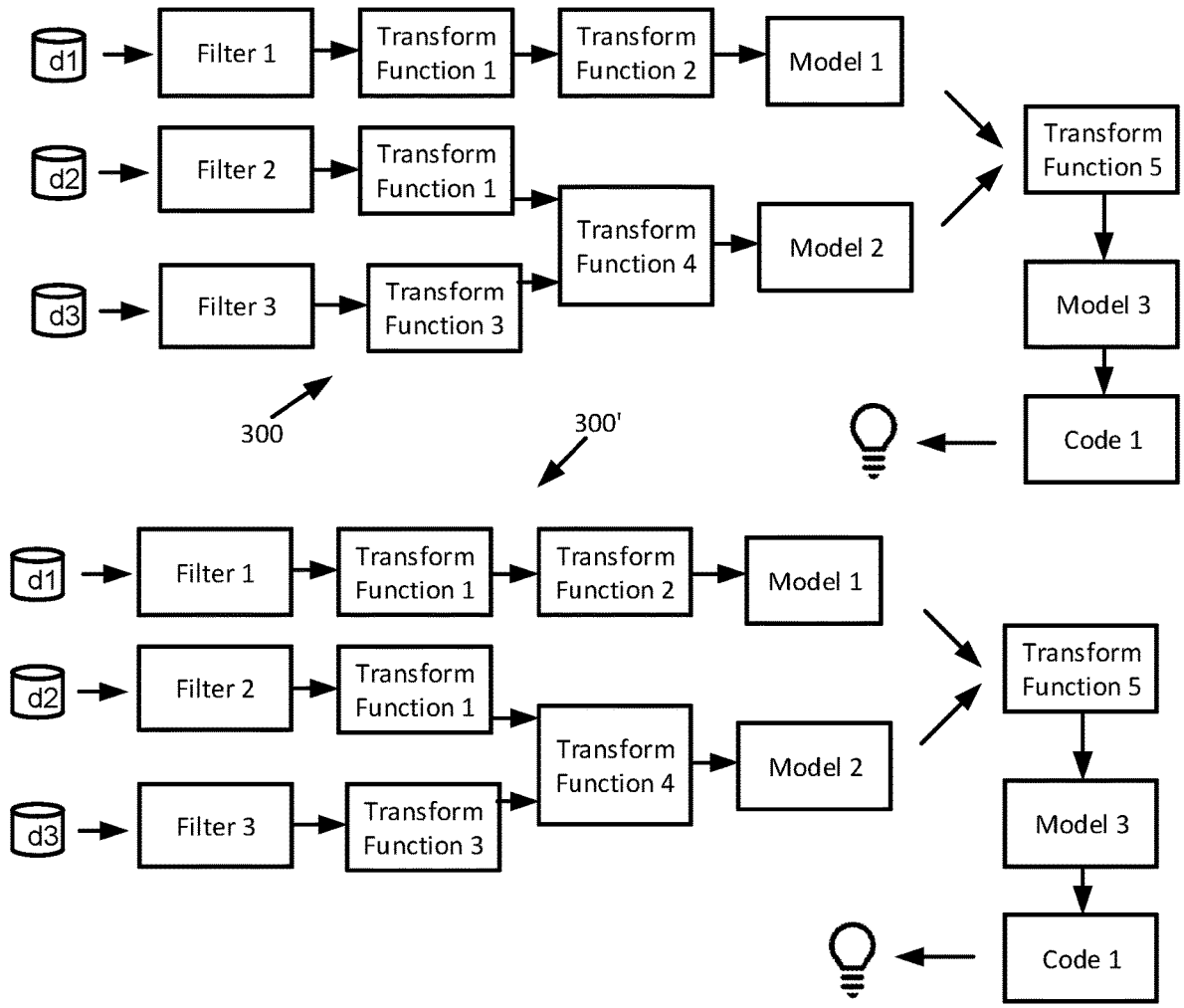
FIG. 8 depicts a diagram representing a comparison of original suspicious activity detection pipeline to regenerated suspicious activity detection pipeline according to an embodiment of the present disclosure.
Figure 9:
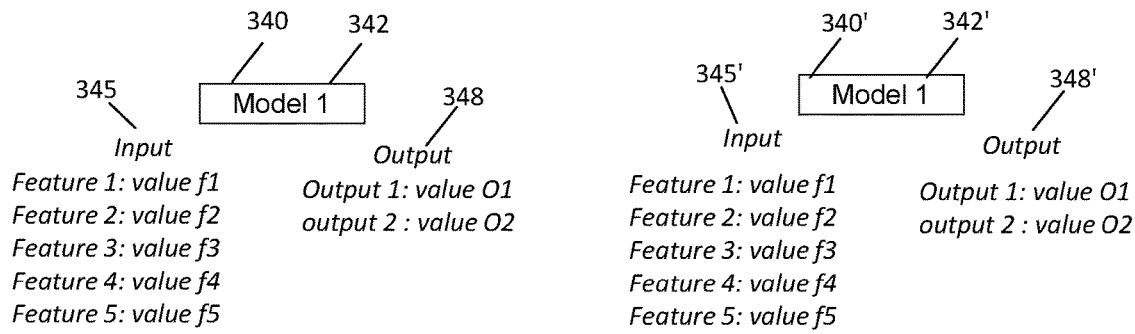
FIG. 9 depicts a diagram representing a comparison of the tasks in original suspicious activity detection pipeline to gather the tasks in regenerated suspicious activity detection pipeline according to an embodiment of the present disclosure.

FIG. 8 depicts an overview schematic illustration of original SAD pipeline 300 generated for original run 602 on Jan. 1, 2021 being compared to the regenerated SAD pipeline 300' regenerated for the re-run 602' on May 1, 2021. FIG. 9 depicts an overview schematic illustration of the original task 305, including the input and output of Model 1 342, performed in original SAD pipeline 300 being compared to the regenerated task 305', including the input and output of Model 1 342', performed in regenerated SAD pipeline 300'. While FIG. 9 illustrates the comparison of original Model 1 342 with the regenerated Model 1 342', it can be appreciated that each of the tasks 305, 305' in the original and regenerated pipelines 300, 300' can be compared to show that the regenerated pipeline 300' is the same as original pipeline 300. That is, in one or more embodiments, the inputs, outputs, and each of the filters 320, transform functions 330, models 340, and codes 350 in SAD pipeline 300 that generated the original alert 290 is compared to the inputs, outputs, and each of the filters 320', transform functions 330', models 340', and codes 350' in SAD pipeline 300'. It can be further appreciated that comparing the pipeline depicted in FIG. 8 and the tasks depicted in FIG. 9 can be performed as part of 570 (and/or 560) in process 500.

Figure 10:
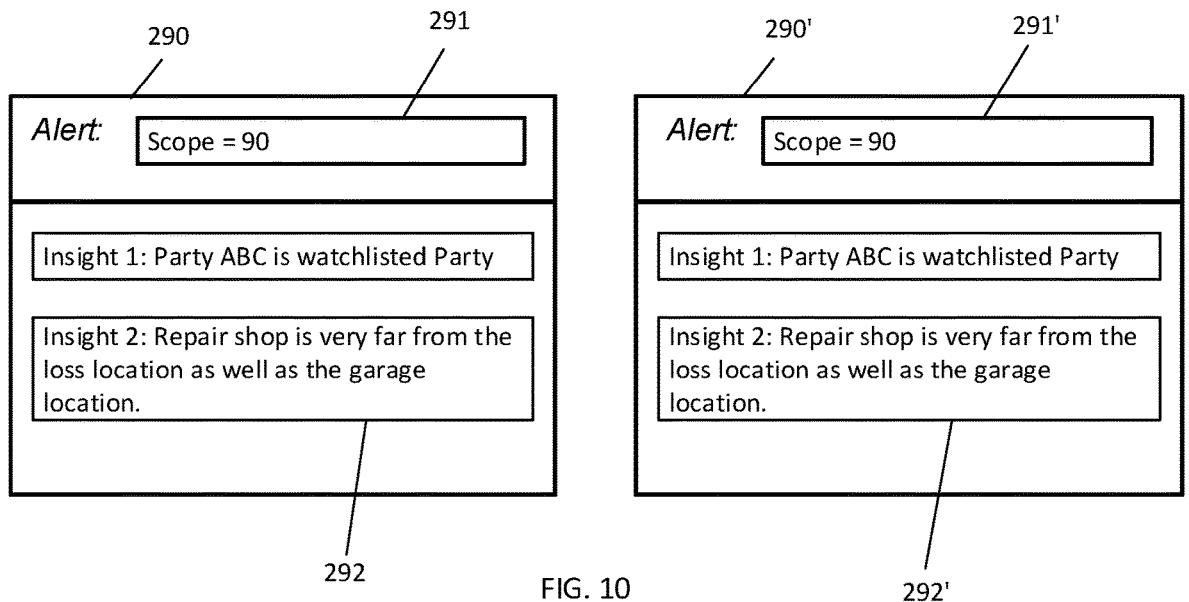
FIG. 10 depicts a diagram representing a comparison of the original alert output by the original suspicious activity detection pipeline to the original alert output by the regenerated suspicious activity detection pipeline according to an embodiment of the present disclosure.

FIG. 10 depicts an overview schematic illustration of original alert 290 generated by original run 602 on Jan. 1, 2021 being compared to the alert 290' regenerated by the run 602' on May 1, 2021. As shown in FIG. 10 the score 291 and insights 292 in the original alert 290 can be compared, preferably visually, to the score 291' and insights 292' in the regenerated alert 290'. It can be appreciated that the comparison shown in FIG. 10 can be part of 570 (and/or 560) in process 500. The comparisons of FIGS. 6-10 can be facilitated by Governance View Module 280, which permits users to check the previous result (e.g., alert, pipeline, tasks, data, insights, score, etc.) to the current re-run result (e.g., regenerated alert, pipeline, tasks, data, insights, score, etc.) to ensure there is no bias or tampering in the system.

Figure 11:
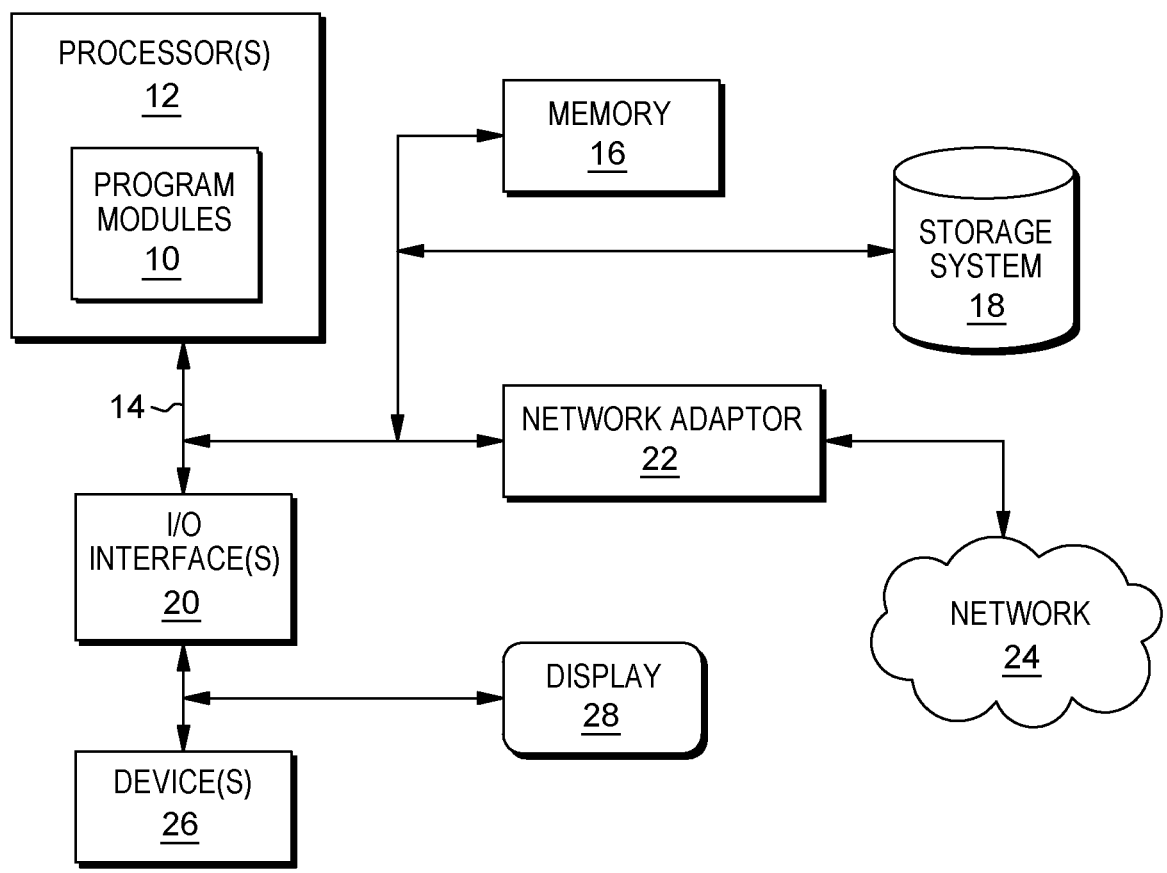
FIG. 11 illustrates yet another exemplary system in accordance with the present disclosure.

FIG. 11 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIGS. 1 & 2).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by the computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for rerunning computer-generated alert reports comprising:
identifying an initial computer-generated alert report to be rerun;
collecting information on the initial computer-generated alert report;
gathering information on the configuration of an initial computer-generated data analytics pipeline that generated the initial computer-generated alert report,
wherein the initial computer-generated data analytics pipeline comprises one or more initial computer-implemented data analytics models and at least one initial data preparation group consisting of initial electronic data filters, initial electronic data transform functions, and combinations thereof that process electronic input data to create an initial feature set for use by the one or more initial computer-implemented data analytics models, and wherein the initial electronic data filters process electronic data to obtain desired electronic data in a desired format, the initial electronic data transform functions transform electronic data to generate one or more initial feature sets, and the initial computer-implemented data analytics models comprise initial unsupervised machine learning models, and further wherein the initial computer-generated data analytics pipeline comprises the one or more initial computer-implemented data analytics models and one or more of the initial data preparation groups configured to create a flow of initial tasks that receives electronic input data as input to the initial computer-generated data analytics pipeline and processes the electronic input data to generate the initial computer-generated alert report;

gathering electronic data used to generate the initial computer-generated alert report;

creating a recreated computer-generated data analytics pipeline based upon the information gathered on the configuration of the initial computer-generated data analytics pipeline that generated the initial computer-generated alert report, wherein the recreated computer-generated data analytics pipeline comprises one or more recreated computer-implemented data analytics models and at least one recreated data preparation group consisting of recreated electronic data filters, recreated electronic data transform functions, and combinations thereof that process electronic input data to create a recreated feature set for use by the one or more recreated computer-implemented data analytics models, and wherein the recreated electronic data filters process the gathered electronic data to obtain desired recreated electronic data in a desired recreated format, the recreated electronic data transform functions transform electronic data to generate one or more recreated feature sets, and the recreated computer-implemented data analytics models comprise recreated unsupervised machine learning models, and further wherein the recreated computer-generated data analytics pipeline comprises the recreated computer-implemented data analytics models and one or more of the recreated data preparation groups configured to create a recreated flow of recreated tasks that receives the gathered electronic input data as input to the recreated computer-generated data analytics pipeline and processes the gathered electronic input data to create a rerun computer-generated alert report; and running the recreated computer-generated data analytics pipeline using the gathered electronic data to create the rerun computer-generated alert report.

2. The computer-implemented method according to claim 1, further comprising clearing any configurations of the initial computer-generated data analytics pipeline and electronic data prior to recreating the recreated computer-generated data analytics pipeline.

3. The computer-implemented method according to claim 1 performed by a processor executing instructions in a pipeline replay module.

4. The computer-implemented method according to claim 1, further comprising gathering an output of each recreated task in the recreated computer-generated data analytics pipeline in response to running the recreated computer-generated data analytics pipeline using the gathered data to create the rerun computer-generated alert report.

5. The computer-implemented method according to claim 1, further comprising comparing the rerun through the recreated computer-generated data analytics pipeline using the gathered data from a previous run through the initial computer-generated data analytics pipeline that generated the initial computer-generated alert report.

6. The computer-implemented method according to claim 5, further comprising comparing the rerun computer-generated alert report to the initial computer-generated alert report.

7. The computer-implemented method according to claim 6, further comprising performing a side-by-side comparison of the gathered electronic data used in the run through the recreated computer-generated data analytics pipeline to the electronic data used in the previous run through the initial computer-generated data analytics pipeline that generated the initial computer-generated alert report.

8. The computer-implemented method according to claim 1, further comprising performing a side-by-side comparison of the recreated tasks performed in the run through the recreated computer-generated data analytics pipeline to the initial tasks performed in the previous run through the initial computer-generated data analytics pipeline that generated the initial computer-generated alert report.

9. The computer-implemented method according to claim 8, further comprising generating a visual display of the side-by-side comparison of the recreated tasks performed in the run through the recreated computer-generated data analytics pipeline to the initial tasks performed in the previous run through the initial computer-generated data analytics pipeline that generated the initial computer- generated alert report.

10. A computer-implemented system to rerun computer generated alert reports comprising:
a memory storage device storing program instructions; and
a hardware processor having circuitry and logic to execute said program instructions to rerun computer-generated alert reports, the hardware processor coupled to said memory storage device and in response to executing said program instructions, is configured to:
identify an initial computer-generated alert report to be rerun;
collect information on the initial computer-generated alert report;
gather information on the configuration of an initial computer-generated data analytics pipeline that generated the initial computer-generated alert report,
wherein the initial computer-generated data analytics pipeline comprises one or more initial computer-implemented data analytics models and at least one initial data preparation group consisting of initial electronic data filters, initial electronic data transform functions, and combinations thereof that process electronic input data to create an initial feature set for use by the one or more initial computer-implemented data analytics models, and wherein the initial electronic data filters process electronic data to obtain desired electronic data in a desired format, the initial electronic data transform functions transform electronic data to generate one or more initial feature sets, and the initial computer-implemented data analytics models comprise initial unsupervised machine learning models, and
further wherein the initial computer-generated data analytics pipeline comprises the one or more initial computer-implemented data analytics models and one or more of the initial data preparation groups configured to create a flow of initial tasks that receives electronic input data as input to the initial computer-generated data analytics pipeline and processes the electronic input data to generate the initial computer-generated alert report;

gather electronic data used to generate the initial computer-generated alert report;

create a recreated computer-generated data analytics pipeline based upon the information gathered on the configuration of the initial computer-generated data analytics pipeline that generated the initial computer-generated alert report, wherein the recreated computer-generated data analytics pipeline comprises one or more recreated computer-implemented data analytics models and at least one recreated data preparation group consisting of recreated electronic data filters, recreated electronic data transform functions, and combinations thereof that process electronic input data to create a recreated feature set for use by the one or more recreated computer-implemented data analytics models, and wherein the recreated electronic data filters process the gathered electronic data to obtain desired recreated electronic data in a desired recreated format, the recreated electronic data transform functions transform electronic data to generate one or more recreated feature sets, and the recreated computer-implemented data analytics models comprise recreated unsupervised machine learning models, and further wherein the recreated computer-generated data analytics pipeline comprises the recreated computer-implemented data analytics models and one or more of the recreated data preparation groups configured to create a recreated flow of recreated tasks that receives the gathered electronic input data as input to the recreated computer-generated data analytics pipeline and processes the gathered electronic input data to create a rerun computer-generated alert report; and run the recreated computer-generated data analytics pipeline using the gathered electronic data to create a rerun computer-generated alert report.

11. The computer-implemented system according to claim 10, wherein the hardware processor, in response to executing said program instructions, is further configured to clear any initial computer-generated pipeline configurations and electronic data prior to recreating the recreated computer-generated data analytics pipeline.

12. The computer-implemented system according to claim 10, further comprising a pipeline replay module containing programing instructions, wherein the hardware processor, in response to executing said program instructions in said pipeline replay module, is configured to create the rerun computer-generated alert report.

13. The computer-implemented system according to claim 10, wherein the hardware processor, in response to executing said program instructions, is further configured to gather an output of each recreated task in the recreated computer-generated data analytics pipeline in response to running the recreated computer-generated data analytics pipeline using the gathered data to create the re-run computer-generated alert report.

14. The computer-implemented system according to claim 10, wherein the hardware processor, in response to executing said program instructions, is further configured to compare the run through the recreated computer-generated data analytics pipeline using the gathered data to a previous run through the initial computer-generated data analytics pipeline that generated the initial computer-generated alert report.

15. The computer-implemented system according to claim 14, wherein the hardware processor, in response to executing said program instructions, is further configured to compare the rerun computer-generated alert report to the initial computer-generated alert report.

16. The computer-implemented system according to claim 15, wherein the hardware processor, in response to executing said program instructions, is further configured to perform a side-by-side comparison of the electronic data used in the run through the recreated computer-generated data analytics pipeline to the electronic data used in the run through the initial computer-generated data analytics pipeline that generated the initial computer-generated alert report.

17. The computer-implemented system according to claim 10, wherein the hardware processor, in response to executing said program instructions, is further configured to perform a side-by-side comparison of the recreated tasks performed in the run through the recreated data analytics pipeline to the initial tasks performed in the previous run through the initial computer-generated data analytics pipeline that generated the initial computer-generated alert report.

18. The computer-implemented system according to claim 17, wherein the hardware processor, in response to executing said program instructions, is further configured to generate a visual display of the side-by-side comparison of the recreated tasks performed in the run through the recreated computer-generated data analytics pipeline to the initial tasks performed in the previous run through the initial computer-generated data analytics pipeline that generated the initial computer-generated alert report.

19. A non-transitory computer readable medium comprising instructions that, when executed by at least one hardware processor, configure the at least one hardware processor to:

identify an initial computer-generated alert report to be rerun;

collect information on the initial computer-generated alert report;

gather information on the configuration of an initial computer-generated data analytics pipeline that generated the initial computer-generated alert report, wherein the initial computer-generated data analytics pipeline comprises one or more initial computer-implemented data analytics models and at least one initial data preparation group consisting of initial electronic data filters, initial electronic data transform functions, and combinations thereof that process electronic input data to create an initial feature set for use by the one or more initial computer-implemented data analytics models, and wherein the initial electronic data filters process electronic data to obtain desired electronic data in a desired format, the initial electronic data transform functions transform electronic data to generate one or more initial feature sets, and the initial computer-implemented data analytics models comprise initial unsupervised machine learning models, and further wherein the initial computer-generated data analytics pipeline comprises the one or more initial computer-implemented data analytics models and one or more of the initial data preparation groups configured to create a flow of initial tasks that receives electronic input data as input to the initial computer-generated data analytics pipeline and processes the electronic input data to generate the initial computer-generated alert report;

gather electronic data used to generate the initial computer-generated alert report;

create a recreated computer-generated data analytics pipeline based upon the information gathered on the configuration of the initial computer-generated data analytics pipeline that generated the initial computer-generated alert report, wherein the recreated computer-generated data analytics pipeline comprises one or more recreated computer-implemented data analytics models and at least one recreated data preparation group consisting of recreated electronic data filters, recreated electronic data transform functions, and combinations thereof that process electronic input data to create a recreated feature set for use by the one or more recreated computer-implemented data analytics models, and wherein the recreated electronic data filters process the gathered electronic data to obtain desired recreated electronic data in a desired recreated format, the recreated electronic data transform functions transform electronic data to generate one or more recreated feature sets, and the recreated computer-implemented data analytics models comprise recreated unsupervised machine learning models, and further wherein the recreated computer-generated data analytics pipeline comprises the recreated computer-implemented data analytics models and one or more of the recreated data preparation groups configured to create a recreated flow of recreated tasks that receives the gathered electronic input data as input to the recreated computer-generated data analytics pipeline and processes the gathered electronic input data to create a rerun computer-generated alert report; and run the recreated computer-generated data analytics pipeline using the gathered electronic data to create a rerun computer-generated alert report.

20. The non-transitory computer readable medium according to claim 19, further comprising instructions that, when executed by at least one hardware processor, configure the at least one hardware processor to:

gather an output of each recreated task in the recreated computer-generated data analytics pipeline in response to running the recreated computer-generated data analytics pipeline using the gathered electronic data to create the rerun computer-generated alert report; and compare the run through the recreated computer-generated data analytics pipeline using the gathered electronic data to a previous run through the initial computer-generated data analytics pipeline that generated the initial computer-generated alert report, including comparing the recreated input and a recreated output of each recreated task performed in the running of the recreated computer-implemented data analytics pipeline using the gathered electronic data to the initial input and an initial output of each initial task performed in the previous run through the initial computer-generated data analytics pipeline that generated the initial computer-generated alert report.

* * * * *